(12) United States Patent
Tsugawa (10) Patent No.: US 12,372,395 B2
(45) Date of Patent: Jul. 29, 2025

(54) COMBINATION SCALE FOR DETECTING INCORRECT INSERTION OF ITEMS IN THE COMBINATION SCALE

(71) Applicant: YAMATO SCALE CO., LTD., Akashi (JP)

(72) Inventor: Hisashi Tsugawa, Akashi (JP)

(73) Assignee: Yamato Scale Co., Ltd., Akashi (JP)

( * ) Notice: Subject to any disclaimer, the term of this patent is extended or adjusted under 35 U.S.C. 154(b) by 399 days.

(21) Appl. No.: 17/916,393

(22) PCT Filed: Apr. 22, 2020

(86) PCT No.: PCT/JP2020/017302
§ 371 (c)(1),
(2) Date: Sep. 30, 2022

(87) PCT Pub. No.: WO2021/214906
PCT Pub. Date: Oct. 28, 2021

(65) Prior Publication Data
US 2023/0184578 A1  Jun. 15, 2023

(51) Int. Cl.
*G01G 19/393* (2006.01)
(52) U.S. Cl.
CPC ................. *G01G 19/393* (2013.01)
(58) Field of Classification Search
CPC .... G01G 19/387; G01G 19/393; G01G 13/16; B65G 43/08
See application file for complete search history.

(56) References Cited

U.S. PATENT DOCUMENTS

| | | | |
|---|---|---|---|
| 4,442,910 A * | 4/1984 | Mikami | G01G 19/393 198/429 |
| 4,529,050 A | 7/1985 | Mosher et al. | |
| 4,821,820 A * | 4/1989 | Edwards | G01G 19/393 177/1 |
| 5,270,495 A | 12/1993 | Mosher et al. | |

(Continued)

FOREIGN PATENT DOCUMENTS

| JP | 60-154120 A | 8/1985 |
|---|---|---|
| JP | 6-10825 U | 2/1994 |

(Continued)

*Primary Examiner* — Randy W Gibson
(74) *Attorney, Agent, or Firm* — Norris McLaughlin, P.A.

(57) ABSTRACT

For any weight change of items in a combination of discharge-target weighing conveyers selected by combinatorial computations during a standby state before the conveyers start to be driven, the combinatorial computations are executed again to select a new combination of discharge-target weighing conveyers, so that the items on the selected weighing conveyers that changed in weight are not transported to a collection conveyer without being possibly reselected into the new combination of conveyers. For any weight change of the items in the combination of discharge-target weighing conveyers during a transport-active state after the conveyers start to be driven, at least one of the collection conveyer or the weighing conveyer subject to the weight change is no longer driven or driven in an opposite transport direction, so that the items on the selected weighing conveyers that changed in weight are not transported into a packaging machine subsequent to the collection conveyer.

7 Claims, 4 Drawing Sheets

(56) References Cited

U.S. PATENT DOCUMENTS

| | | | |
|---|---|---|---|
| 5,596,179 A | 1/1997 | Sakaeda | |
| 9,079,721 B2 * | 7/2015 | Kawanishi | B65G 43/08 |
| 9,459,134 B2 | 10/2016 | Kawashima | |
| 2014/0027187 A1 * | 1/2014 | Kosaka | G01G 19/393 |
| | | | 177/25.18 |

FOREIGN PATENT DOCUMENTS

| | | | |
|---|---|---|---|
| JP | 2012-154905 A | 8/2012 | |
| JP | 2013-120121 A | 6/2013 | |
| WO | 93/23724 A1 | 11/1993 | |
| WO | 2012/101684 A1 | 8/2012 | |

* cited by examiner

COMBINATION SCALE FOR DETECTING INCORRECT INSERTION OF ITEMS IN THE COMBINATION SCALE

TECHNICAL FIELD

This invention relates to a combination scale that combines and weighs target items so that their summed weight falls within a predetermined range of weights and that discharges the items thus combined and weighed.

BACKGROUND ART

The combination scales may be roughly divided into three different types of scales; automatic scales, semiautomatic scales, and manually operated scales, in accordance with how items to be weighed are supplied to and discharged from their weighing units. The manually operated combination scales require manpower for both of supply and discharge of the items. The semiautomatic combination scales receive items that are manually supplied and mechanically discharge the received items. In the automatic combination scales, both of the supply and discharge of items are automated without the need to rely on manpower.

The manually operated or semiautomatic combination scales may be selected for any items to be weighed and supplied that are difficult or unsuitable for automatic handling.

Patent literature 1 describes an example of the semiautomatic combination scales of the known art. This combination scale has a top plate in an upper part of a body frame, and the top plate has a plurality of throw-in ports. Items to be weighed are thrown by an operator into these ports and then supplied to weighing hoppers; weight measuring units, disposed at positions below the throw-in ports, where the items are weighed.

Combinatorial computations are executed based on weights of the items received by the weighing hoppers to select a combination of discharge-target weighing hoppers containing the items of a summed weight that falls within a predetermined range of weights. The gates of the selected weighing hoppers are opened to discharge and drop the items onto a transport conveyer. This transport conveyer transports the items of a weight within a predetermined range of weights into an apparatus in a subsequent stage, like a packaging machine, to manufacture pouches each containing the items of a weight within a predetermined range of weights.

The semiautomatic combination scale possibly undergoes some weighing errors. For example, an operator may throw an item(s) by mistake into the selected weighing hopper(s) by the time when the items already weighed are discharged from the weighing hopper. In this instance, such an item(s) added by mistake to the selected weighing hopper(s), as well as the items weighed earlier in these weighing hoppers, may be discharged onto the transport conveyer. Then, the mistakenly added item(s) and the items previously weighed and having an appropriate weight may be transported together by the transport conveyer to an apparatus subsequent to the transport conveyer, for example, a packaging machine, where all of the items may be packed into one pouch. Thus, a weighing error occurs.

To avoid such a weighing error, the semiautomatic combination scale described in patent literature 1 repeatedly calculates a summed weight value of the items in the selected discharge-target weighing hoppers until the items are discharged from these weighing hoppers to determine whether the calculated summed weight value stays within in a predetermine range of weights. In case the total weight value is beyond the range of weights, combinatorial computations are executed again, assuming that an item(s) has been added to the weighing hopper(s).

CITATION LIST

Patent Document

Patent Document 1: Utility Model Registration No. 06-10825

SUMMARY OF THE INVENTION

Technical Problems

In the semiautomatic combination scale described in patent literature 1, the combinatorial computations are performed again in case an item(s) is newly added to the items in the selected weighing hoppers until these weighing hoppers start to discharge the items, i.e., until the gates of these weighing hoppers are opened. This may certainly reduce the risk of weighing errors.

If an operator happens to add by mistake an item(s) to the selected weighing hoppers at an exact time when the gates of these hoppers are opened to discharge the items, the added item(s), as well as the items already in the selected weighing hoppers, may be discharged onto the transport conveyer and transported together by the transport conveyer into the packaging machine. As a result, the mistakenly added item(s) and the items previously weighed and having an appropriate weight may be transported together by the transport conveyer to an apparatus in a subsequent stage, for example, a packaging machine, where all of the items may be packed into one pouch in the packaging machine, resulting in a weighing error.

This invention was accomplished to address these issues of the known art and is directed to providing effective means that can prevent weighing errors after a weighing unit(s) starts to discharge items.

Technical Solutions

To this end, the present invention provides the following technical aspects.

1]
A combination scale according to this invention includes:
 a plurality of weighing conveyers that transport items to be weighed, the weighing conveyers being manually supplied with the items during a transport inactive state;
 a plurality of weight sensors disposed correspondingly to the plurality of weighing conveyers to measure weights of the items in the plurality of weighing conveyers;
 a collection conveyer that receive the items discharged and supplied from the plurality of weighing conveyers and that transport and discharge the items received; and
 a controller that executes combinatorial computations for selecting a combination of discharge-target weighing conveyers from the plurality of weighing conveyers based on weight values measured by the plurality of weight sensors, the combination of discharge-target weighing conveyers containing the items having a summed weight that falls within a predetermined range of weights, the controller further driving the plurality of weighing conveyers and the collection conveyer to operate, the controller further driving the combination of discharge-target weighing conveyers to discharge items onto the collection conveyer.

For any weight change of the items in the combination of discharge-target weighing conveyers selected earlier by the combinatorial computations during a standby state before the combination of discharge-target weighing conveyers starts to be driven, the controller executes the combinatorial computations again to select a new combination of discharge-target weighing conveyers.

For any weight change of the items in the combination of discharge-target weighing conveyers selected earlier by the combinatorial computations during a transport-active state after the combination of discharge-target weighing conveyers starts to be driven, the controller discontinues to drive at least one of the collection conveyer or the weighing conveyer subject to the weight change or drives at least the one of the collection conveyer or the weighing conveyer in a direction opposite to an original direction of transport.

After a combination of discharge-target weighing conveyers is selected by the combinatorial computations, an operator possibly accidentally add an item(s) to or mistakenly remove one or more of the items from these weighing conveyers during the standby state before they start to be driven. This may result in a weight change of the items on these weighing conveyers. In this instance, the combination scale according to this invention executes the combinatorial computations again to select a new combination of discharge-target weighing conveyers. Thus, the items on the selected weighing conveyers that accidentally included an additional item(s) or lost an item(s) after being weighed may be unlikely to arrive at the collection conveyer without being possibly reselected into the new combination of weighing conveyers. As a result, any possible weighing errors may be successfully avoidable.

During the transport-active state after the weighing conveyers selected earlier by the combinatorial computations start to be driven, an operator possibly accidentally add an item(s) to or mistakenly remove one or more of the items from these weighing conveyers, resulting in a weight change of the items on the weighing conveyers. In this instance, at least one of the collection conveyer or the weighing conveyer subject to the weight change is no longer driven or at least one of these conveyers is driven in the direction opposite to the original direction of transport.

The items on the selected weighing conveyers that accidentally included an additional item(s) or lost an item(s) may be kept on the weighing conveyer or the collection conveyer after at least one of these conveyers is deactivated, or at least one of these conveyers may be driven in the opposite direction of transport to have such weight-changed items transported back and collected. Thus, the items that changed in weight by the addition or loss of an item(s) after being weighed may be unlikely to arrive at an apparatus subsequent to the collection conveyer, for example, a packaging machine. As a result, any possible weighing errors may be successfully avoidable.

Assuming that the items on the selected weighing conveyers that accidentally included an additional item(s) or lost an item(s) after being weighed are discharged onto the collection conveyer, this invention may prevent such weigh-changed items from arriving at an apparatus subsequent to the collection conveyer, for example, a packaging machine by deactivating the collection conveyer or driving the collection conveyer in the opposite direction of transport.

2] In a preferred embodiment of this invention, for any weight change of the items in the combination of discharge-target weighing conveyers selected earlier by the combinatorial computations during the transport-active state after the combination of discharge-target weighing conveyers starts to be driven, the controller discontinues to drive the collection conveyer or drives the collection conveyer in the direction opposite to the original direction of transport.

After a combination of discharge-target weighing conveyers is selected by the combinatorial computations, an operator possibly accidentally add an item(s) to or mistakenly remove one or more of the items from these weighing conveyers during the transport-active state after they start to be driven, resulting in a weight change of the items on the weighing conveyers. In this instance, the combination scale according to this embodiment discontinues to drive the collection conveyer or drives the collection conveyer in the opposite direction of transport. Thus, the items in the selected weighing conveyers that accidentally included an additional item(s) or lost an item(s) after being weighed may be unlikely to be transported by the collection conveyer into a subsequent packaging machine in the original direction of transport. As a result, any possible weighing errors may be successfully avoidable.

3] In other embodiments of this invention, the controller starts to drive the combination of discharge-target weighing conveyers in response to input of a discharge request signal.

According to these embodiments, the selected weighing conveyers start to be driven in response to a discharge request signal transmitted from, for example, an apparatus subsequent to the collection conveyer like a packaging machine and then discharge the items onto the collection conveyer. Thus, the collection conveyer may successfully transport the items from the selected weighing hoppers into a subsequent apparatus like a packaging machine.

4] In other embodiments of this invention, the combination scale further includes an informing unit controllable by the controller. The controller discontinues to drive at least the one of the collection conveyer or the weighing conveyer or informs, using the informing unit, that the weighing conveyer is mistakenly supplied with an item when the controller drives at least the one of the collection conveyer or the weighing conveyer in the direction opposite to the original direction of transport.

After a combination of discharge-target weighing conveyers is selected by the combinatorial computations, an operator possibly accidentally add an item(s) to or mistakenly remove one or more of the items from these weighing conveyers during the transport-active state after they start to be driven, resulting in a weight change of the items on the weighing conveyers. In this instance, the controller discontinues to drive at least one of the collection conveyer or the weighing conveyer subject to the weight change after being weighed or the controller drives at least the one of the collection conveyer or the weighing conveyer in the direction opposite to the original direction of transport.

According to these embodiments, the controller discontinues to drive at least the one of the collection conveyer or the weighing conveyer or informs, using the informing unit, that the weighing conveyer is mistakenly supplied with an item when the controller drives at least the one of the collection conveyer or the weighing conveyer in the direction opposite to the original direction of transport. This may help an operator to easily know why the conveyer is no longer driven or is driven in the opposite direction of transport, allowing him/her to take appropriate actions.

5] In other embodiments of this invention, the plurality of weighing conveyers are arranged next to each other, the collection conveyer transports the items discharged from the plurality of weighing conveyers in a direction of arrangement of the plurality of weighing conveyers, and groups of weighing conveyers each including the plurality of weighing conveyers are disposed across the collection conveyer on both sides thereof.

According to these embodiments, the collection conveyer may be reduced in length by arranging the weighing conveyers on both sides of the collection conveyer. This may favorably reduce time required to discharge the items and also lead to downsizing of the combination scale.

Effects of the Invention

After a combination of discharge-target weighing conveyers is selected by the combinatorial computations, an operator possibly accidentally add an item(s) to or mistakenly remove one or more of the items from these weighing conveyers during the standby state before they start to be driven, resulting in a weight change of the items on the weighing conveyers. According to this invention, the combinatorial computations are executed again to select a new combination of discharge-target weighing conveyers. Thus, the items on the selected weighing conveyer(s) subject to any weight change may be unlikely to arrive at the collection conveyer without being possibly reselected into the new combination of weighing conveyers. As a result, any possible weighing errors may be successfully avoidable.

During the transport-active state after the weighing conveyers selected earlier by the combinatorial computations start to be driven, an operator possibly accidentally add an item(s) to or mistakenly remove one or more of the items from these weighing conveyers, resulting in a weight change of the items on the weighing conveyers. In this instance, at least one of the collection conveyer or the weighing conveyer subject to the weight change is no longer driven or at least one of these conveyers is driven in the direction opposite to the original direction of transport. Thus, the items that changed in weight may be unlikely to arrive at an apparatus subsequent to the collection conveyer, for example, a packaging machine. As a result, any possible weighing errors may be successfully avoidable.

In case the items on the weighing conveyer(s) subject to any weight change are discharged into the collection conveyer, the combination scale according to this invention discontinues to drive the collection conveyer or drives the collection conveyer in the opposite direction of transport. Thus, such weigh-changed items may be successfully prevented from being discharged into an apparatus subsequent to the collection conveyer like a packaging machine. As a result, any possible weighing errors may be successfully avoidable.

DESCRIPTION OF EMBODIMENTS

Embodiments of this invention are hereinafter described in detail with reference to the accompanying drawings.

Figure 1:
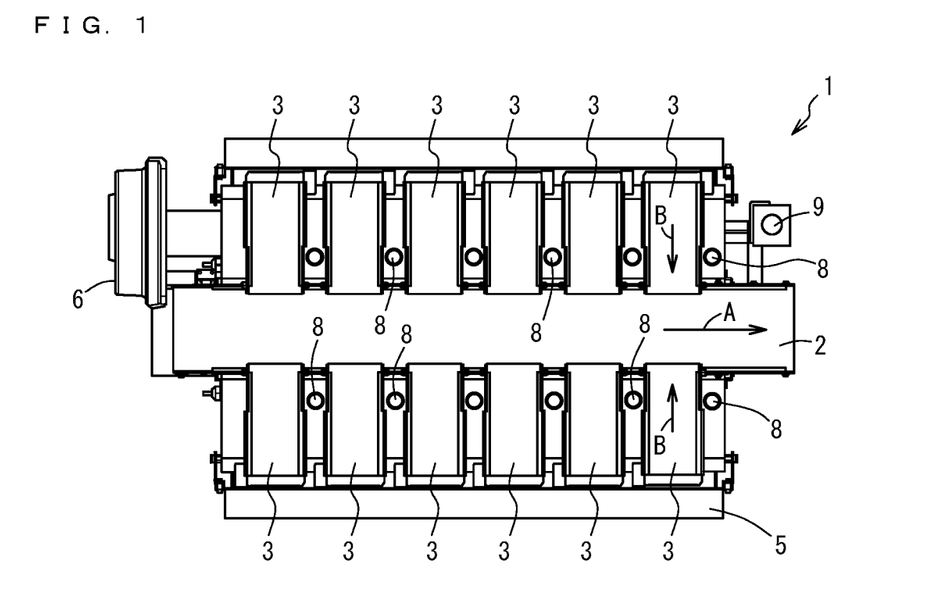
FIG. 1 is a plan view of a combination scale according to an embodiment of this invention.
Figure 2:
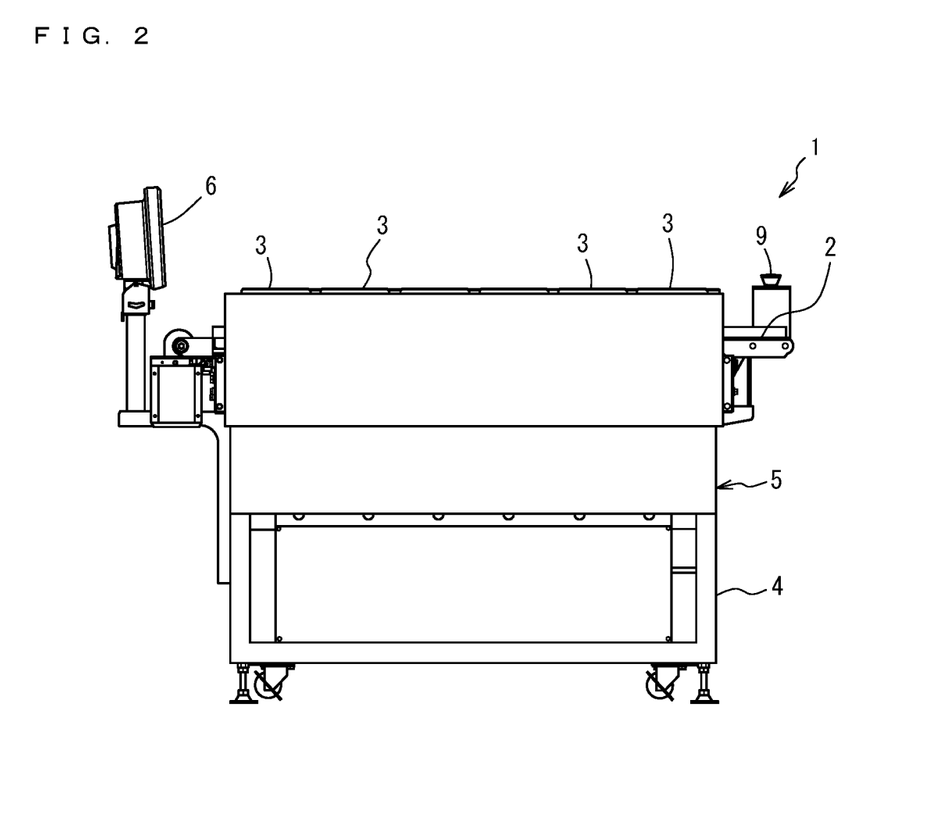
FIG. 2 is a front view of the combination scale illustrated in FIG. 1.

FIG. 1 is a plan view of a combination scale according to an embodiment of this invention. FIG. 2 is a front view of the combination scale illustrated in FIG. 1.

A combination scale 1 according to this embodiment is a semiautomatic combination scale that receives items that are manually supplied by an operator and that mechanically discharge the received items. This combination scale 1 is equipped with a collection conveyer 2 including a belt conveyer, multiple weighing conveyers 3 each including a belt conveyer, a body 5, and an operation setting displayer 6 of touch-panel type. The collection conveyer 2 transports items to be weighed in a direction indicated with arrow A. The weighing conveyers 3; 12 weighing conveyers 3 in the illustrated example, are arranged in two rows in the direction of transport of the collection conveyer 2. The body 5 is supported on a pedestal 4 illustrated in FIG. 2. The operation setting displayer 6 displays thereon operation statuses and parameter settings for operation control.

As illustrated in FIG. 1, the weighing conveyers 3 each have, on a lateral side thereof, a display light 8; an example of the informing unit. By blinking the indicator lamp 8, it is notified that the operator has erroneously supplied the items to be weighed to the weighing conveyor 3. An emergency stop button 9 is used for emergency shutdown of the combination scale 1.

When the items are discharged from a combination of discharge-target weighing conveyers 3 selected by combinatorial computations, the collection conveyer 2 transports the items in the arrow-A direction illustrated in FIG. 1 into a subsequent apparatus, for example, a packaging machine, where the items will be packed into pouches.

The items to be weighed, though not necessarily limited to any particular ones, may be suitably selected from foodstuffs including precut vegetables, vegetables like shiitake mushroom and carrot, and cut fillets and pieces of fish and meat.

The weighing conveyers 3 are linearly arranged next each other in two rows; six for each side, along the collection conveyer 2. Thus, two groups of weighing conveyers 3 are disposed on both sides of the collection conveyer 2. The direction of transport of the weighing conveyers 3; a direction indicated with arrow B, is a direction orthogonal to the direction of transport A of the collection conveyer 2. There is only a small difference in height between the weighing conveyers 3 and the collection conveyer 2. This may reduce an impact imposed on the items when they are discharged from the weighing conveyers 3 onto the collection conveyer 2.

A working table, not illustrated in the drawings, is disposed on the outer side of each row of the weighing conveyers 3, i.e., below the lower group of weighing conveyers 3 and above the upper groups of weighing conveyers 3. The items to be weighed are temporarily retained on this table.

An operator manually feeds the items on the table into the empty weighing conveyers currently inactive.

The weighing conveyers 3 are driven by driving motors respectively located below these conveyers. The weighing conveyers 3 and the driving motors are supported by weight sensors, like load cells (not illustrated in the drawings), installed in the body 5. A load signal is transmitted from each of the weight sensors to a controller described later. The controller then calculates the weight of items on the weighing conveyer 3 and prompts the weighing conveyer 3 to discharge the items.

Figure 3:
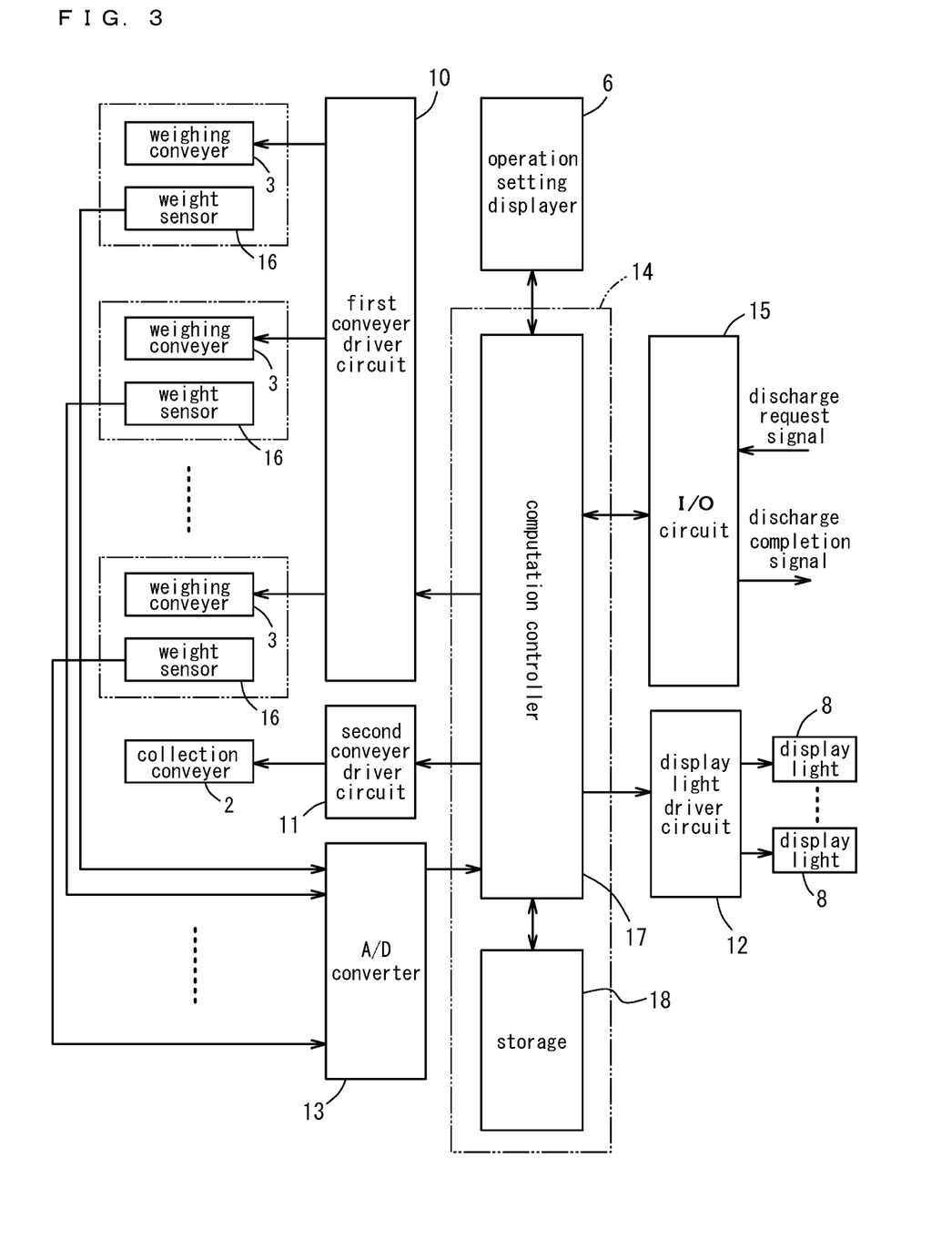
FIG. 3 is a block diagram of the combination scale illustrated in FIG. 1.

FIG. 3 is a block diagram of the combination scale 1, in which any components similar or identical to those of FIGS. 1 and 2 are illustrated with the same reference signs.

This combination scale 1 includes first and second conveyer driver circuits 10 and 11, a display light driver circuit 12, an A/D converter 13, a controller 14, and an I/O circuit 15. The weighing conveyers 3 and the collection conveyer 2 are respectively driven by the driver circuits 10 and 11. The display lights 8 are each driven to emit blinking light by the display light driver circuit 12. The A/D converter 13 is in charge of A/D conversion of an analog load signal from each weight sensor 16. The controller 14 controls the respective units and components. The controller 14 also applies a filtering process to a digital load signal received from the A/D converter 13 to execute the combinatorial computations.

The weighing conveyers 3 are supported by the weight sensors 16 like load cells, as described earlier. The weights of items on the weighing conveyers are detected by these weight sensors 16. Then, the resulting signals; analog load signals, are converted by the A/D converter 13 into digital load signals and then transmitted to the controller 14.

The controller 14 includes a computation controller 17 including CPU, and a storage 18 including memories, for example, RAM and ROM. In the storage 18 are stored an operation program and data of operation parameters and weighing results.

The controller 14 executes the operation program stored in the storage 18 to control the whole combination scale 1. The controller 14 also executes data processing, for example, the combinatorial computations.

The controller 14 controls discharge of the items to be weighed by prompting the first conveyer driver circuit 10 to drive the weighing conveyers 3 and also by prompting the second conveyer driver circuit 11 to drive the collection conveyer 2. The controller 14 fetches a discharge request signal transmitted from a packaging machine through the I/O circuit 15. When the discharge of items is completed, the controller 14 outputs a discharge completion signal to the packaging machine. In response to setting inputs through the operation setting displayer 6, the controller 14 receives signal inputs. The controller 14 also outputs signals for display of data to the operation setting displayer 6.

In the combination scale 1 thus structured, an operator manually fees the items onto the empty weighing conveyers 3 currently inactive. The controller 14 applies a filtering process to the digital load signal received from the A/D converter 13 to obtain the weight value of the items. Then, the controller 14 executes the combinatorial computations, in which, as a result of the weights of items on the weighing conveyers 3 being variously combined, a combination of discharge-target weighing conveyers 3 is selected that contains the items having a summed weight that falls within a predetermined range of weights. In case there are two or more combinations of discharge-target weighing hoppers having a summed weight that falls within a predetermined range of weights, one of the combinations is selected that has a smallest absolute value of a difference between the obtained combined weight and a target combined weight. In response to input of the discharge request signal transmitted from the packaging machine, the controller 14 starts to drive the selected weighing conveyers 3 and also starts to drive the collection conveyer 2. The weighing conveyers 3 carrying the items are driven for a first predetermined length of time to discharge the items onto the collection conveyer 2. The collection conveyer 2 carrying the items from the weighing conveyers 3 is driven for a second predetermined length of time to discharge the items into the packaging machine. The controller 14 outputs the discharge completion signal to the packaging machine at a predetermined point in time. These steps are repeatedly carried out.

When the weighing conveyers 3 supplied with the items are selected as discharge-target weighing conveyers during the operation described above, the selected weighing conveyers 3 are not driven and stay on standby until the discharge request signal input is received.

These weighing conveyers 3 on standby are already supplied with the items and are thus not empty. An operator, therefore, is forbidden to add or remove an item(s) to and from the weighing conveyers 3.

An inexperienced operator, who is trying to fulfill a required production volume in a time-pressured situation, may be led to misjudgments, for example, finding the items on the weighing conveyers 3 too few or too many, possibly adding or removing an item(s) to and from the weighing conveyer(s) 3.

In case the weighing conveyers 3 on standby start to be driven in response to input of the discharge request signal from the packaging machine after an item(s) is mistakenly added to or removed from these weighing conveyers, the items, which are smaller or larger in weight than measured earlier when these weighing hoppers 3 were selected, may be transported by the weighing conveyers 3 into the collection conveyer 2. This leads to a weighing error.

The inexperienced operator, as described above, may rush to perform the operation regardless of whether the selected weighing conveyers are on standby, inadvertently adding or removing an item(s) to and from these weighing conveyers. This leads to a weighing error likewise.

This embodiment provides the following means to prevent such weighing errors that are caused by an operator's misjudgments on the item supply to the weighing conveyers 3 before or after they start to be driven.

The means according to this embodiment for prevention of possible weighing errors include monitoring the weight of items on the selected combination of discharge-target weighing conveyers 3, cancelling the currently selected combination of weighing conveyers for any weight change during the standby state and then executing the combinatorial computations again, and selecting a new combination of discharge-target weighing conveyers. The weight of the newly selected combination of weighing hoppers is monitored likewise, this new combination of weighing conveyers is cancelled for any weight change during the standby state, and the combinatorial computations are executed again to select another new combination of discharge-target weighing conveyers.

Thus, the items on the discharge-target weighing conveyers 3 subject to any weight change from a weight measured earlier when they were selected may be unlikely to arrive at the collection conveyer 2 without being possibly reselected into the new combination of weighing conveyers. As a result, any possible weighing errors may be successfully avoidable.

The items on the selected weighing conveyers 3 are monitored likewise after these weighing conveyers start to be driven, and the display light 8; informing unit, emits blinking light for any weight change of the items to notify of an operator of addition or removal of an item(s) to and from the weighing conveyer(s) 3. Further, the operation of the collection conveyer 2 is suspended or the collection conveyer 2 is driven in the opposite direction of transport so that the items are transported back and discharged.

Thus, the items on the selected weighing conveyers 3 subject to any weight change from a weight measured earlier when they were selected may be prevented from being transported by the collection conveyer 2 in the original direction of transport and then into the packaging machine. As a result, any possible weighing errors may be successfully avoidable.

Any false item supply to the weighing conveyer 3 may be informed with a buzzing sound instead of blinking light from the display light 8 or may be informed with both of these sound and light.

Figure 4:
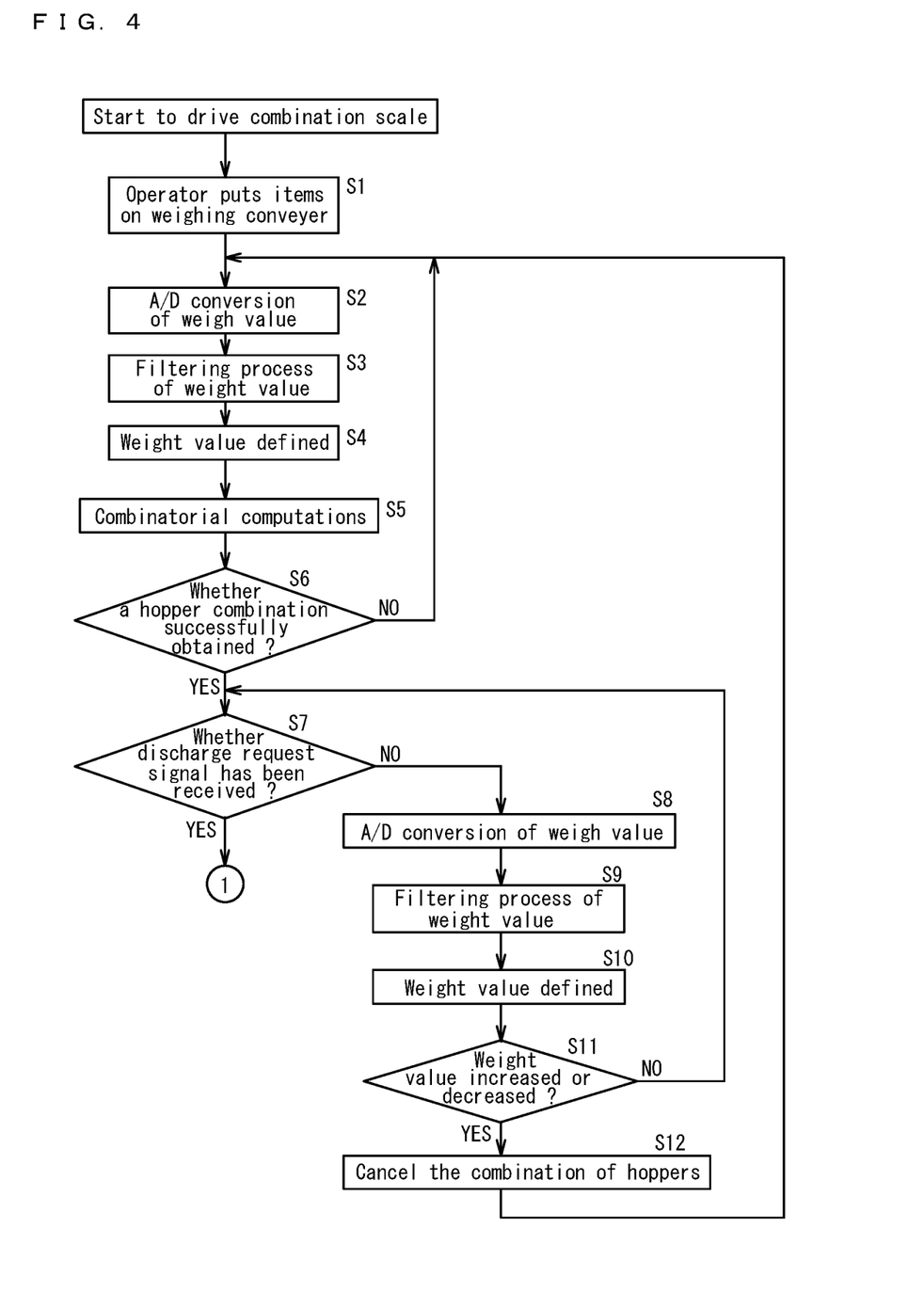
FIG. 4 is a flow chart of processing steps by the combination scale illustrated in FIG. 1.

Next, an exemplified operation to prevent false item supply in the combination scale according to this embodiment is hereinafter described with reference to the flow chart of FIG. 4.

First, the combination scale is activated, and an operator supplies the empty weighing conveyers 3 yet to be driven with items to be weighed (step S1). The load signal from the weight sensor 16 corresponding to a respective one of the weighing conveyers 3 is subjected to AD conversion (step S2) and then a filtering process (step S3), and the load signal is thereby stabilized to define the weight value (step S4). The combinatorial computations are executed based on this weight value of the items in the weighing conveyer 3 (step S5) to determine whether a combination of discharge-target weighing conveyers 3 has been selected, i.e., whether the weighing conveyers have been appropriately combined and selected (step S6). In the case of NO in step s6, the operation returns to step S2.

In the case of YES in step S6, it is determined whether a discharge request signal has been received from the subsequent packaging machine (step S7). When the discharge request signal has been received, the process shifts to the discharge process shown in FIG. 5, which will be described later. When the discharge request signal has not been received, it is assumed that the apparatus is in a standby state, and the process proceeds to step S8.

In step S8, the load signals from the weight sensors 15 of the selected weighing conveyers 3 are subjected to A/D conversion and then a filtering process (step S9) to define a weight value (step S10). It is determined whether the defined weight value has been changed from a weight value when these weighing hoppers 3 were selected (step S11). For any change, decrease or increase, of the weight value, it is determined that an item(s) has been added to or removed from the weighing conveyer 3 by, for example, an operator's mistake. Then, the currently selected combination of weighing conveyers is cancelled (step S12), and the operation returns to step S2, in which a weight value is fetched to execute the combinatorial computations again.

Figure 5:
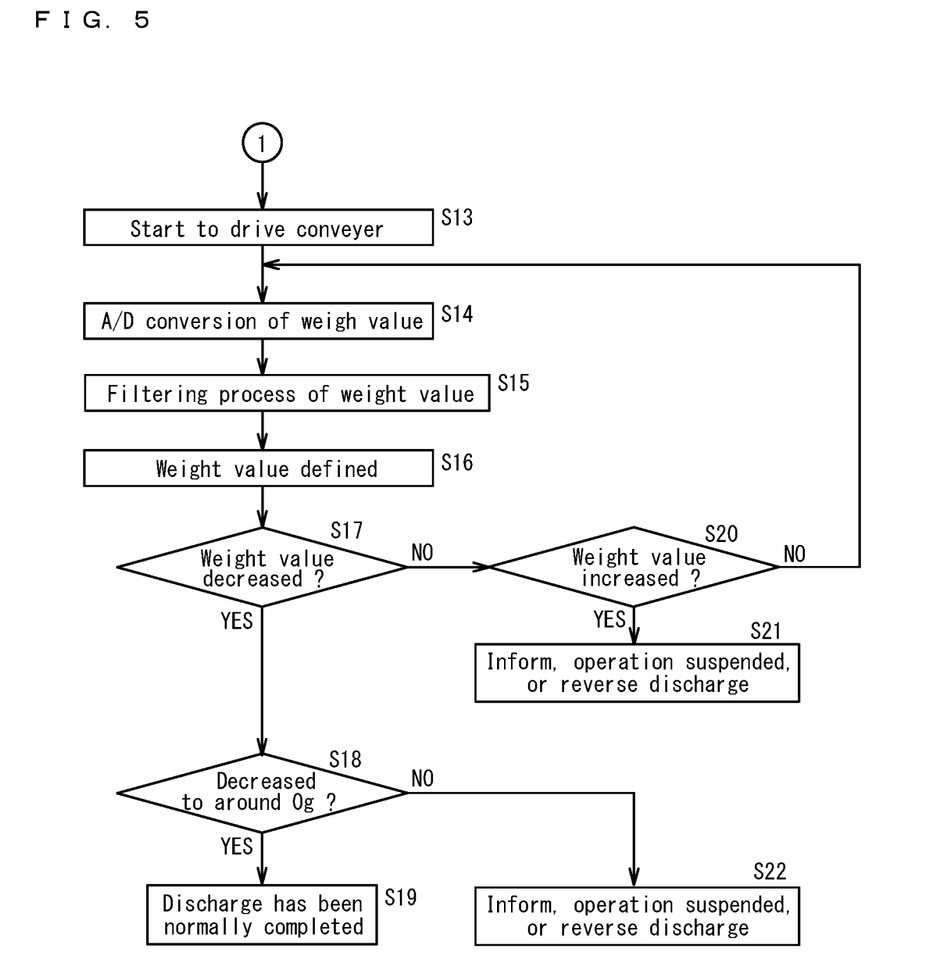
FIG. 5 is a flow chart that follows FIG. 4.

When, subsequent to YES in step S6, S7 confirms that input of the discharge request signal from the packaging machine, the operation proceeds to processing steps illustrated in FIG. 5 to discharge the items from the selected combination of discharge-target weighing conveyers 3.

The selected combination of discharge-target weighing conveyers 3 start to be driven as illustrated in FIG. 5 (step S13), and the load signals from the weight sensors 16 of the driven weighing conveyers 3 are subjected to A/D conversion (step S14) and then a filtering process (step S15). This filtering process performed while the weighing conveyers 3 are being driven differs from the filter processes in steps S3 and S9. Unlike the earlier steps, the filtering process in this step changes a filtering coefficient value to a value suitably used to attenuate vibration noises of the weighing conveyers 3. When a post-filtering weight value is defined (step S16), it is determined whether the weight value has decreased from the earlier weight value (step S17).

When step S17 confirms any decrease of the weight value, it is then determined whether the weight value has decreased to a weight approximate to 0 g (step S18). When a decrease of the weight value to around 0 g is confirmed, the operation ends, assuming that the items on the weighing conveyers 3 have been normally discharged onto the collection conveyer 2 (step S19).

When the weight value, though somewhat decreased, is found to be not as small as a weight value approximate to 0 g, the display light 8 is turned on to emit blinking light, assuming that an item(s) has been added to or removed from the weighing conveyer 3 by, for example, an operator's mistake after the selected weighing conveyers 3 start to be driven. Then, the operation of the collection conveyer 2 is suspended, or the collection conveyer 2 is driven in the opposite direction of transport so that the items are transported back and collected into a collection container not illustrated in the drawings (step S22). When it is chosen to suspend the operation of the collection conveyer 2, the items on the collection conveyer 2 are collected by an operator.

When step S17 fails to confirm any decrease of the weight value from the weight value measured earlier when the weighing hoppers were selected, it is determined whether the weight value has increased from the earlier weight value (step S20). When such an increase is confirmed, the display light 8 is turned on to emit blinking light, assuming that an item(s) has been added to the weighing conveyer 3 by, for example, an operator's mistake after the selected weighing conveyers 3 start to be driven. Then, the operation of the collection conveyer 2 is suspended, or the collection conveyer 2 is driven in the opposite direction of transport so that the items are transported back and collected into a collection container not illustrated in the drawings (step S21).

When step S20 confirms no weight increase, the operation returns to step S14, assuming that the weight value remains unchanged.

After a combination of discharge-target weighing conveyers 3 is selected by the combinatorial computations, an operator possibly accidentally add an item(s) to or mistakenly remove one or more of the items from these weighing conveyers during the standby state before they start to be driven, resulting in a weight change of the items on the weighing conveyers. In this instance, the combination scale according to this embodiment executes the combinatorial computations again to select a new combination of discharge-target weighing conveyers. Thus, the items on the selected weighing conveyers that accidentally included an additional item(s) or lost an item(s) after being weighed may be unlikely to arrive at the collection conveyer 2 without being possibly reselected into the new combination of weighing conveyers. As a result, possible weighing errors may be successfully avoidable.

During the transport-active state after the weighing conveyers 3 selected earlier by the combinatorial computations start to be driven, an operator possibly accidentally add an item(s) to or mistakenly remove one or more of the items from these weighing conveyers, resulting in a weight change of the items on the weighing conveyers 3. Then, the display light 8 is turned on to emit blinking light to inform that an item(s) has been mistakenly added or removed. Further, the operation of the collection conveyer 2 is suspended, or the collection conveyer 2 is driven in the opposite direction of transport. Thus, the items on the weighing conveyer 3 that accidentally included an additional item(s) or lost an item(s) after being weighed may stay on the collection conveyer 2 or transported back in the opposite direction of transport and then collected by the collection conveyer 2. Such items that changed in weight on the weighing conveyer 3, therefore, may be prevented from being transported to the packaging machine subsequent to the collection conveyer 2. As a result, possible weighing errors may be successfully avoidable.

The items on the weighing conveyer 3 which an item(s) has been mistakenly added to or removed from may possibly be discharged onto the collection conveyer 2. Yet, the operation of the collection conveyer 2 is suspended or the collection conveyer 2 is driven in the opposite direction of transport to prevent the transport of such items to the packaging machine subsequent to the collection conveyer 2. Likewise, a weighing error may be unlikely to occur.

In the earlier embodiment, in case an operator possibly accidentally add an item(s) to or mistakenly remove one or more of the items from the weighing conveyers 3 selected earlier as discharge-target weighing conveyers during the transport-active state after these weighing conveyers 3 start to be driven, the operation of the collection conveyer 2 is suspended, or the collection conveyer 2 is driven in the opposite direction of transport. In other embodiments of this invention, the operation of the weighing conveyers 3 may be suspended, or the direction of transport of the weighing conveyers 3 with a relatively long distance of transport may be reversed while the mistakenly supplied items are still staying on these conveyers. Otherwise, the operations of the weighing conveyer 3 and the collection conveyer 2 may be both suspended or the directions of transport of both of them may be reversed.

In the earlier embodiment, the packaging machine is disposed subsequent to the collection conveyer 2. In other embodiments, the items discharged from the collection conveyer 2 may be received and put into a packaging bag by an operator, in which case the operator pushes a switch nearby to input the discharge request signal to the combination scale 1.

REFERENCE SIGN LIST

1 combination scale
2 collection conveyer
3 weighing conveyer
6 operation setting displayer
8 display light (informing unit)
14 controller

The invention claimed is:

1. A combination scale, comprising:
a plurality of weighing conveyers that transport items to be weighed, the weighing conveyers being manually supplied with the items during a transport inactive state;
a plurality of weight sensors disposed correspondingly to the plurality of weighing conveyers to measure weights of the items in the plurality of weighing conveyers;
a collection conveyer that receive the items discharged and supplied from the plurality of weighing conveyers and that transport and discharge the items received; and
a controller that executes combinatorial computations for selecting a combination of discharge-target weighing conveyers from the plurality of weighing conveyers based on weight values measured by the plurality of weight sensors, the combination of discharge-target weighing conveyers containing the items having a summed weight that falls within a predetermined range of weights, the controller further driving the plurality of weighing conveyers and the collection conveyer to operate, the controller further driving the combination of discharge-target weighing conveyers to discharge items onto the collection conveyer,
the controller executing the combinatorial computations again to select a new combination of discharge-target weighing conveyers for any weight change of the items in the combination of discharge-target weighing conveyers selected earlier by the combinatorial computations during a standby state before the combination of discharge-target weighing conveyers starts to be driven,
the controller discontinuing to drive at least one of the collection conveyer or the weighing conveyer subject to the weight change or drives at least the one of the collection conveyer or the weighing conveyer in a direction opposite to an original direction of transport for any weight change of the items in the combination of discharge-target weighing conveyers selected earlier by the combinatorial computations during a transport-active state after the combination of discharge-target weighing conveyers starts to be driven.

2. The combination scale according to claim 1, wherein the controller discontinues to drive the collection conveyer or drives the collection conveyer in the direction opposite to the original direction of transport for any weight change of the items in the combination of discharge-target weighing conveyers selected earlier by the combinatorial computations during the transport-active state after the combination of discharge-target weighing conveyers starts to be driven.

3. The combination scale according to claim 1, wherein the controller starts to drive the combination of discharge-target weighing conveyers in response to input of a discharge request signal.

4. The combination scale according to claim 2, wherein the controller starts to drive the combination of discharge-target weighing conveyers in response to input of a discharge request signal.

5. The combination scale according to one of claims 1 to 4, further comprising an informing unit controllable by the controller, wherein
the controller discontinues to drive at least the one of the collection conveyer or the weighing conveyer, or
the controller informs, using the informing unit, that the weighing conveyer is mistakenly supplied with an item when the controller drives at least the one of the collection conveyer or the weighing conveyer in the direction opposite to the original direction of transport.

6. The combination scale according to one of claims 1 to 4, wherein
the plurality of weighing conveyers are arranged next to each other,
the collection conveyer transports the items discharged from the plurality of weighing conveyers in a direction of arrangement of the plurality of weighing conveyers, and
groups of weighing conveyers each including the plurality of weighing conveyers are disposed across the collection conveyer on both sides thereof.

7. The combination scale according to claim 5, wherein
the plurality of weighing conveyers are arranged next to each other,
the collection conveyer transports the items discharged from the plurality of weighing conveyers in a direction of arrangement of the plurality of weighing conveyers, and groups of weighing conveyers each including the plurality of weighing conveyers are disposed across the collection conveyer on both sides thereof.

* * * * *